(12) United States Patent
Suzuki

(10) Patent No.: US 6,880,367 B2
(45) Date of Patent: Apr. 19, 2005

(54) KNIT DESIGN METHOD AND DEVICE

(75) Inventor: Noriyuki Suzuki, Wakayama (JP)

(73) Assignee: Shima Seiki Manufacturing Limited, Wakayama (JP)

(*) Notice: Subject to any disclaimer, the term of this patent is extended or adjusted under 35 U.S.C. 154(b) by 0 days.

(21) Appl. No.: 10/491,538

(22) PCT Filed: Oct. 4, 2002

(86) PCT No.: PCT/JP02/10355
§ 371 (c)(1),
(2), (4) Date: Oct. 28, 2004

(87) PCT Pub. No.: WO03/032203
PCT Pub. Date: Apr. 17, 2003

(65) Prior Publication Data
US 2005/0039495 A1 Feb. 24, 2005

(30) Foreign Application Priority Data
Oct. 5, 2001 (JP) ........................ 2001-310559

(51) Int. Cl.$^7$ .............................. D04B 15/00
(52) U.S. Cl. ........................ 66/232; 700/141
(58) Field of Search ................... 66/232, 237; 700/130, 700/131, 132, 141, 135

(56) References Cited

U.S. PATENT DOCUMENTS

| | | | | |
|---|---|---|---|---|
| 4,608,642 A | * | 8/1986 | Shima | 700/141 |
| 4,856,104 A | * | 8/1989 | Stoll et al. | 700/141 |
| 5,388,050 A | * | 2/1995 | Inoue et al. | 700/131 |
| 5,557,527 A | | 9/1996 | Kotaki et al. | |
| 5,719,777 A | * | 2/1998 | Kotaki | 700/131 |
| 5,812,110 A | * | 9/1998 | Kawasaki et al. | 700/141 |
| 6,611,730 B1 | * | 8/2003 | Stoll et al. | 700/131 |
| 6,698,253 B2 | * | 3/2004 | Stoll et al. | 66/232 |

FOREIGN PATENT DOCUMENTS

| | | |
|---|---|---|
| EP | 0 640 707 | 3/1995 |
| EP | 0640707 | 3/1995 |
| JP | 54-127230 | 10/1979 |
| JP | 60-71748 | 4/1985 |
| JP | 7-70890 | 3/1995 |

OTHER PUBLICATIONS

Yuichiro Ito, Masayuki Yamada, Hirohisa Seki, Hidenori Ito, "Amimono ni okeru Himo Jotai Hyogen to Amiagari Moyo Seisei no Ichi Shuho", Transactions of Information Processing Society of Japan, Jan. 15, 1998, vol. 39, N 1, pp. 60–69.

(Continued)

Primary Examiner—Danny Worrell
(74) Attorney, Agent, or Firm—Wenderoth, Lind & Ponack, L.L.P.

(57) ABSTRACT

An object of the invention is to display an image giving a feeling close to the feeling of a knitted fabric actually knitted with a knitting yarn. Linear knitting yarn image data 1 is divided into a plurality of meshes 2. The mesh 2 is made to match a transformed mesh 3 transformed along the shape of a knitting stitch loop 4. The knitting yarn image data 1 is subjected to an image drawing processing by a mesh transforming technique to create the image of the knitting stitch loop 4. A lower section 4a and an upper section 4b are defined in a portion where the knitting stitch loops 4 are overlapped, the portion where the knitting stitch loops are overlapped is synthesized as a knitted fabric 6, and displayed. Fluffiness or the like is also reproduced, and consequently the feeling like that of an actual knitted fabric can be given.

19 Claims, 12 Drawing Sheets

OTHER PUBLICATIONS

Yuichiro Ito, Masayuki Yamada, Tsuyoshi Miyazaki, Hirohisa Seki, Hidenori Ito, "3 Jigen Himo Zukei Hyogen Hoho o Mochiita Amimono Pattern Shori ni Tsuite", Transactions of Information Processing Society of Japan, Feb. 15, 1996, vol. 37, No. 2, pp. 249–257.

Yuichiro Ito, Masayuki Yamada, Hirohisa Seki, Hidenori Ito, "A Technique for Representing String States of Knitting and Generating completed Knitting Images", Transactions of Information Processing Society of Japan, Jan. 15, 1998, vol. 39, No. 1, pp. 60–69.

Yuichiro Ito, Masayuki Yamada, Tsuyoshi Miyazaki, Hirohisa Seki, Hidenori Ito, "Processing for Knitting Patterns Using a Representation Method for 3D String Diagrams", Transactions of Information Processing Society of Japan, Feb. 15, 1996, vol. 37, No. 2, pp. 249–257.

* cited by examiner (a)

(b)

(b1)   (b2)   (b3)

(c)

(a)

(b)

(a)

(b)

(a)

(b)

(a)

(b)

CROSSING
1 × 1

CROSSING
2 × 2

CROSSING
3 × 3

US 6,880,367 B2

KNIT DESIGN METHOD AND DEVICE

TECHNICAL FIELD

The present invention relates to a knit design method and apparatus that can simulate and display images of a knitted fabric of a knitted product.

BACKGROUND ART

Conventionally, in designing knitted fabrics of kitted products, methods of representation for making knitted fabrics such as knitting stitch symbols or knitting symbols defined by, for example, JIS L 0200 of the Japanese Industrial Standard, are used. The knitting stitch symbols are symbols indicating textures of various knitting stitches such as front knitting stitches, back knitting stitches, front tuck knitting stitches, back tuck knitting stitches, float stitches and transfer stitches. The knitting symbols are symbols indicating the order of knitting with a needle corresponding to each knitting stitch symbol. The methods of representation for making knitted fabrics designate individual knitting stitch constituting a knitted fabric, and according to this designation, knitting data for making a knitted fabric with an automatic flat knitting machine can be generated.

The applicant has proposed in Japanese Unexamined Patent Publication JP-A 60-71748 (1985) a technique for generating knitting data for an automatic flat knitting machine with color codes represented that are substituted for the knitting stitch symbols. Substituting color codes for the knitting stitch symbols makes it easy to design a knitted fabric by image processing with a computer, and textures of more kinds of knitting stitches can be displayed on displaying means, using a large number of colors.

The applicant also has proposed in Japanese Unexamined Patent Publication JP-A 7-70890 (1995) a technique for generating loop images of knitting stitches constituting a knitted fabric by simulation, utilizing data for making a knitted fabric, and displaying the simulated images of the knitted fabric. In this technique, image processing is performed in the following manner. Image data of knitting yarns is stored as yarn samples in advance, and the shape and the position of each loop of knitting stitches, the brightness of each portion and the like are determined based on data for making a knitted fabric, and the loop is divided into a plurality of segments, and synthesized as a loop corresponding to segmented image data of the yarn samples. The segmented image data determine the shape of each loop or the overlap with an underlying loop based on the data for making a knitted fabric. Spline approximation of the segmented image data of a knitting yarn is performed in accordance with the loop shape, and for the overlap with an underlying loop, a mask is produced and an exposed portion of the underlying loop is left, so that the knitted fabric is simulated with images. When the periphery of the yarn sample is made rough, fluffiness can be expressed. When an oblique line is added on the yarn sample, yarn twist can be expressed.

In the case of performing knit design, when the methods of representation for making a knitted fabric are used, the displayed images do not necessarily reflect faithfully the appearance of the actual knitted fabric that is knitted according to the data for making a knitted fabric. Therefore, a designer who designs a knitted fabric with data for making a knitted fabric has to have an ability of imagining the appearance of the actual knitted fabric in designing, and the knitted fabric cannot be designed intuitionally.

When the simulation of a knitting stitch loop proposed in JP-A 7-70890 is used, it is possible to design an actual knitted fabric intuitionally. However, the representation of the fluffiness in the periphery of a knitting yarn or the knitting yarn twist is artificial, and it is difficult to make it close to the feeling of the knitted fabric made by the actual knitting yarn. In particular, in the spline approximation of segments, when segments are simply joined in a curved section, an edge is generated in a junction between the segments, and if both ends of the segments are made soft and overlapped, smooth joining can be realized. However, such joining does not guarantee that fluffiness across the divided segments is displayed as being continuous as it was, and even if image data of a very fluffy knitting yarn is actually used as a color sample, it is difficult to represent natural feeling of the knitted fabric with images in which the knitted fabric is simulated.

DISCLOSURE OF INVENTION

It is an object of the invention to provide a method and apparatus for knit design that can display images representing feeling close to that of an actually made knitted fabric made of a knitting yarn.

The invention provides a knit design method for simulating and displaying an image of a knitted fabric made of a knitting yarn, based on data for making a knitted fabric, comprising:

dividing image data of a linearly extending knitting yarn into a plurality of meshes having a predetermined shape;

setting a transformation state of the meshes so as to go along each knitting stitch loop shape constituting the knitted fabric and maintain a connecting state between the meshes;

transforming the image data of the knitting yarn in accordance with transformation of the mesh for each mesh; and simulating the knitted fabric with images by allowing the image data of the knitting yarn that is transformed along the knitting stitch loop to be continuous according to a predetermined rule, performing rendering with displacement of the continuous image data of the knitting yarn so as to be joined in a direction intersecting with a direction where the knitting yarn is continuous while partially overlapping the continuous image data of the knitting yarn, and performing rendering a portion in which the knitting stitch loops are overlapped on the upper side or the lower side so as to correspond to the joined state.

Furthermore, the invention is characterized in that the shape of the knitting stitch loop is represented by coordinates of a plurality of control points set on a predetermined reference line of the knitting yarn forming the knitting stitch loop with respect to a predetermined basic shape, a shape of a knitting stitch loop different from the basic shape is handled by relatively displacing the position of each control point, and the transformation state of the meshes is set based on information on a line width that can be designated for each control point.

Furthermore, the invention is characterized in that the basic shape has a peak portion of a knitting stitch loop shape formed by a knitting operation with a flat knitting machine and halves of a trough portion on both sides of the peak portion, a plurality of control points are set at both ends of the trough portion of the basic shape, at the center of the peak portion and between both the ends and the center, and it is possible to designate whether rendering is performed on the upper portion of the previously knitted knitting stitch loop or on the lower side thereof.

Furthermore, the invention is characterized in that the image data of the knitting yarn is divided into the meshes in such a manner that a fluffy portion outside the knitting yarn is included.

Furthermore, the invention is characterized in that the knitting yarn is a knitting yarn in which at least one of the shape, the color and the fluffiness state changes over a section having a predetermined length, and the image data is divided into the meshes at least over the section.

Furthermore, the invention is characterized in that the data for making a knitted fabric is generated based on design of a knitted fabric that is performed by aligning various shapes of a knitting stitch loop that are previously prepared.

Furthermore, the invention is characterized in that the shape of the knitting stitch loop is generated by simulation in which the image data of the linearly extending knitting yarn is previously transformed in accordance with the transformation state that goes along the knitting stitch loop.

Furthermore, the invention provides a program for executing any one of the above-described knit design method on a computer.

Furthermore, the invention provides a knit design apparatus for designing a knitted fabric while displaying an image of a knitted fabric on image displaying means, comprising:

knitting yarn image storing means for storing image data of a linearly extending knitting yarn;

mesh dividing means for dividing the image data of the knitting yarn that is read out from the knitting yarn image storing means into a plurality of meshes having a predetermined shape;

data-input means for inputting data for making a knitted fabric to be simulated with images;

shape setting means for setting a transformation state of the meshes based on data for making a knitted fabric that is inputted to the data-input means so as to go along each knitting stitch loop shape constituting the knitted fabric and maintain a connecting state between the meshes; and knitted fabric simulation means for transforming the image data of the knitting yarn that is divided into the meshes by the mesh dividing means for each mesh in accordance with the transformation state of the meshes set by the shape setting means so as to go along each knitting stitch loop, and displaying a portion in which the knitting stitch loops are overlapped according to a predetermined rule on the upper side or the lower side to simulate the knitted fabric with images.

Furthermore, the invention is characterized by further comprising knitted fabric designing means capable of designing a knitted fabric with images by aligning image data representing various shapes of a knitting stitch loop that are previously prepared, for generating the data for making a knitted fabric based on the image data of the designed knitted fabric and inputting the data to the data-input means.

Furthermore, the invention is characterized in that the knitting yarn image storing means can store image data of a plurality of kinds of knitting yarns, and characterized by further comprising knitting yarn designating means for designating a knitting yarn so as to select the image data of the knitting yarn that is to be divided into the meshes by the mesh dividing means among the plurality of kinds.

BRIEF DESCRIPTION OF THE DRAWINGS

Other and further objects, features, and advantages of the invention will be more explicit from the following detailed description taken with reference to the drawings wherein.

BEST MODE FOR CARRYING OUT THE INVENTION

Figure 1:
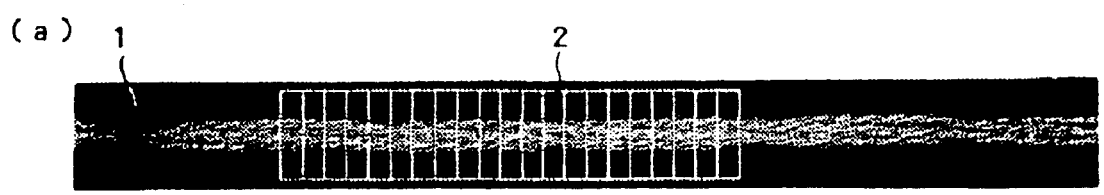
FIG. 1 is a diagram showing the basic concept of simulation of a knit design method of one embodiment of the invention.
Figure 1:
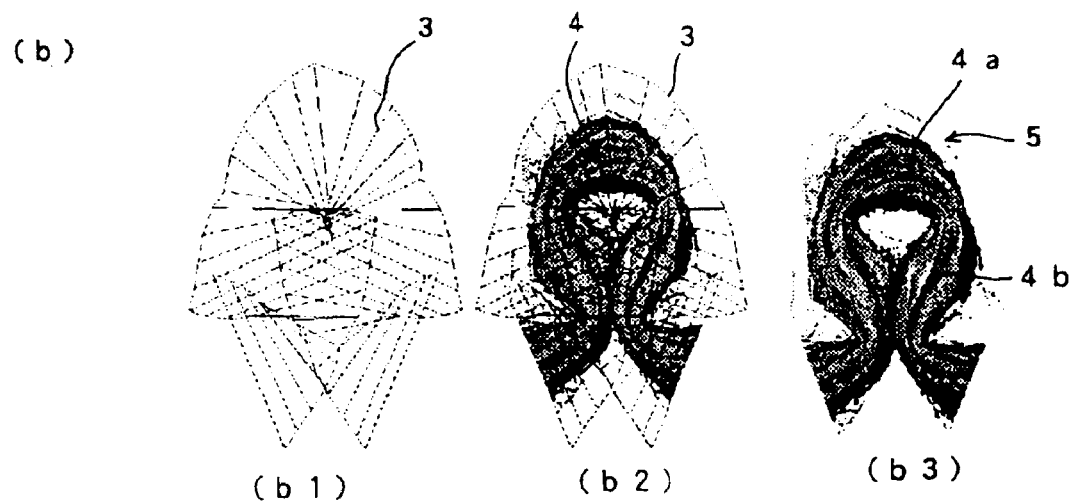
Figure 1:
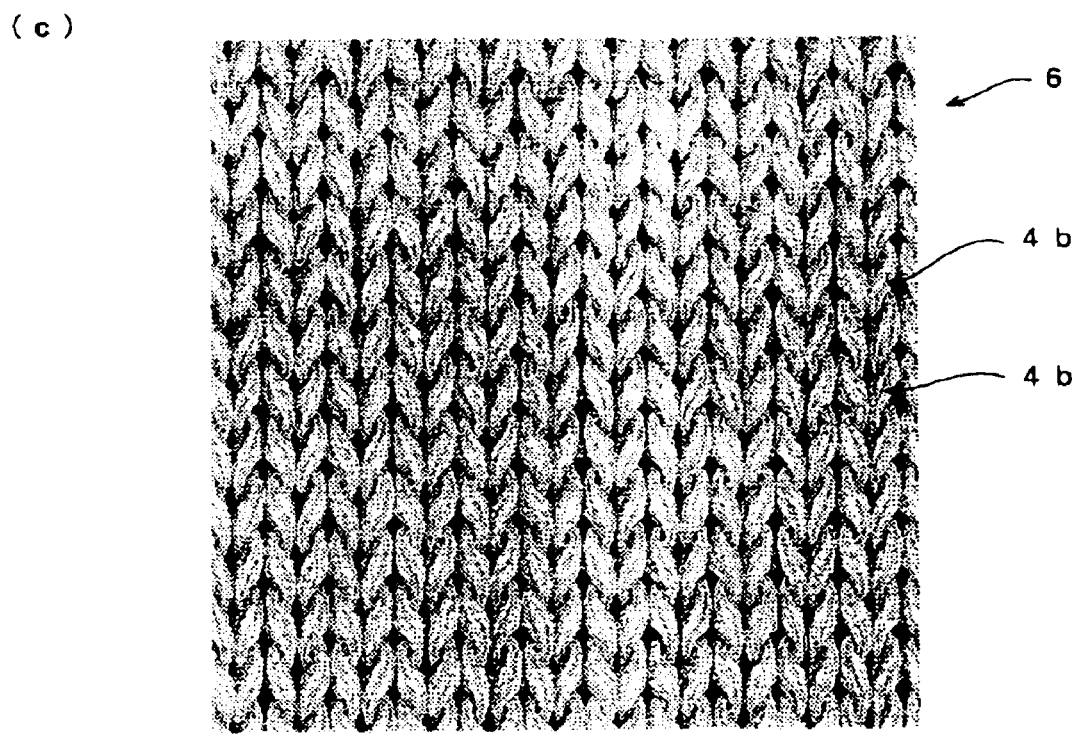

Now referring to the drawings, preferred embodiments of the invention are described below.

FIG. 1 shows the basic concept of simulation of a knit design method of one embodiment of the invention. In this embodiment, as shown in FIG. 1(*a*), at least a part of image data 1 of a linear knitting yarn is divided into a plurality of meshes 2. As shown in FIG. 1(*b*), a knitting stitch loop image is obtained based on transformed meshes 3 corresponding to a knitting stitch loop constituting a knitted fabric. FIG. 1(*b*1) shows an example in which the shape of the transformed meshes 3 is set in accordance with the transformation state to which the knitting yarn is subjected when forming a basic knitting stitch loop. In FIG. 1(*b*2), the image data 1 of a knitting yarn is transformed for every mesh 2 shown in FIG. 1(*a*) in accordance with the transformed meshes 3 so that a knitting stitch loop image 4 is obtained. FIG. 1(*b*3) shows only the knitting stitch loop image 4 with the transformed mesh 3 removed. Fluffiness is also represented in the knitting stitch loop image 4. The knitting stitch loop image 4 is overlapped with the knitting stitch loop image 4 of a neighboring course when making a jersey knitted fabric with front stitches using a flat knitting machine, and a lower section 4*a* that underlies and does not appear and an upper section 4*b* that constitutes an upper side and appears on the surface are set. FIG. 1(*c*) shows an image of a knitted fabric 6 in which primarily the upper sections 4b of the knitting stitch loop image 4 of FIG. 1(b3) are arranged sequentially.

The length of the image data 1 of a knitting yarn shown in FIG. 1(a) is set to a length more than the length that can be divided into the meshes 2 so that a section of at least one cycle can be divided into the meshes 2 based on the periodic pattern of a change in the color, the shape or the state of fluffiness of the knitting yarn. The image data 1 of the knitting yarn in a mesh-divided portion is transformed such that the portion of each mesh 2 corresponds to the transformed mesh 3 shown in FIG. 1(b) sequentially. When the image data 1 of the knitting yarn reaches one end of the meshes 2 in the entire section that is divided into the meshes 2, then this end is joined to the other end of the meshes 2 in the entire section, and this is repeated, so that this is used as a yarn having an indefinite length.

Figure 2:
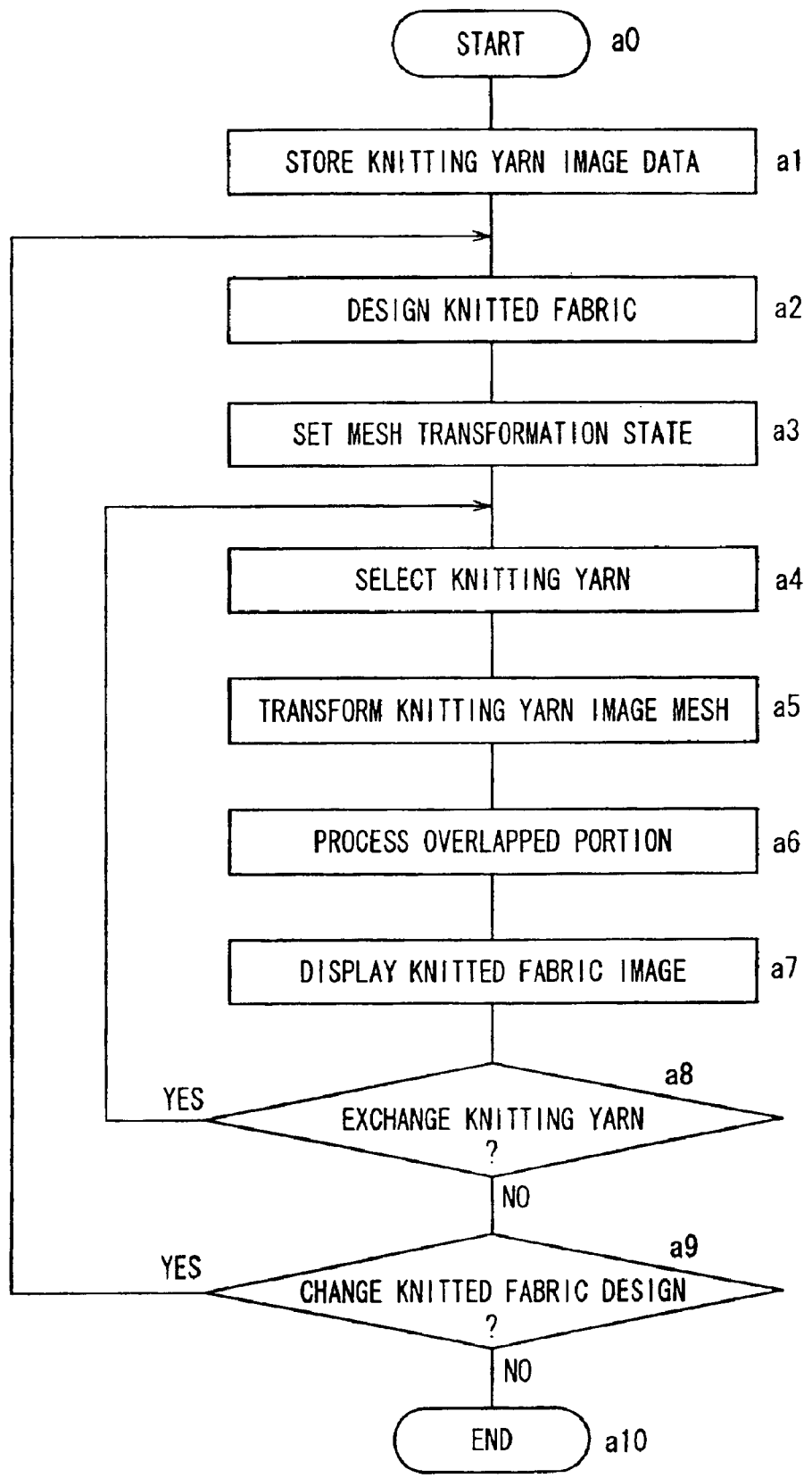
FIG. 2 is a flowchart showing the procedure of simulating a knitted fabric with images based on the concept of FIG. 1.

FIG. 2 shows the procedure of the simulation of the knitted fabric 6 as shown in FIG. 1(c) with images, based on the concept of FIG. 1. The procedure starts from step a0, and in step a1, the image data 1 of a knitting yarn as shown in FIG. 1(a) is stored. The image data 1 of a knitting yarn can be obtained by imaging an actual knitting yarn with a scanner or the like. The computer graphics technique can be used for virtual creation. In step a2, a knitted fabric is designed. A design apparatus for a flat knitting machine or the like can be used. In such a design apparatus, knitting data for designating the type of each knitting stitch is generated. In step a3, the shape of the transformed mesh 3 is set, corresponding to the loop shape of each knitting stitch.

In step a4, for example, the user selects a knitting yarn among stored data of knitting yarns. Then, in step a5, knitting stitch image is generated by mesh transformation, using the selected knitting yarn, as shown in FIG. 1(b). In step a6, portions of the image in which the loops of the knitting stitches are overlapped are processed. In step a7, the knitted fabric 6 shown in FIG. 1(c) is displayed.

The designer looks at the displayed image of the knitted fabric 6 in step a8, and further determines whether or not the knitting yarn is exchanged. When it is determined to exchange the knitting yarn, the procedure goes back to step a4, and the image data 1 of another yarn is selected. Even if the knitting yarn is not changed in step a8, it is determined whether or not the knitted fabric design itself is changed in step a9. When changing the knitted fabric design, the procedure goes back to step a2, where a predetermined editing operation or the like is performed to design a knitted fabric. When there is no change in step a9, the procedure ends with step a10.

Figure 3:
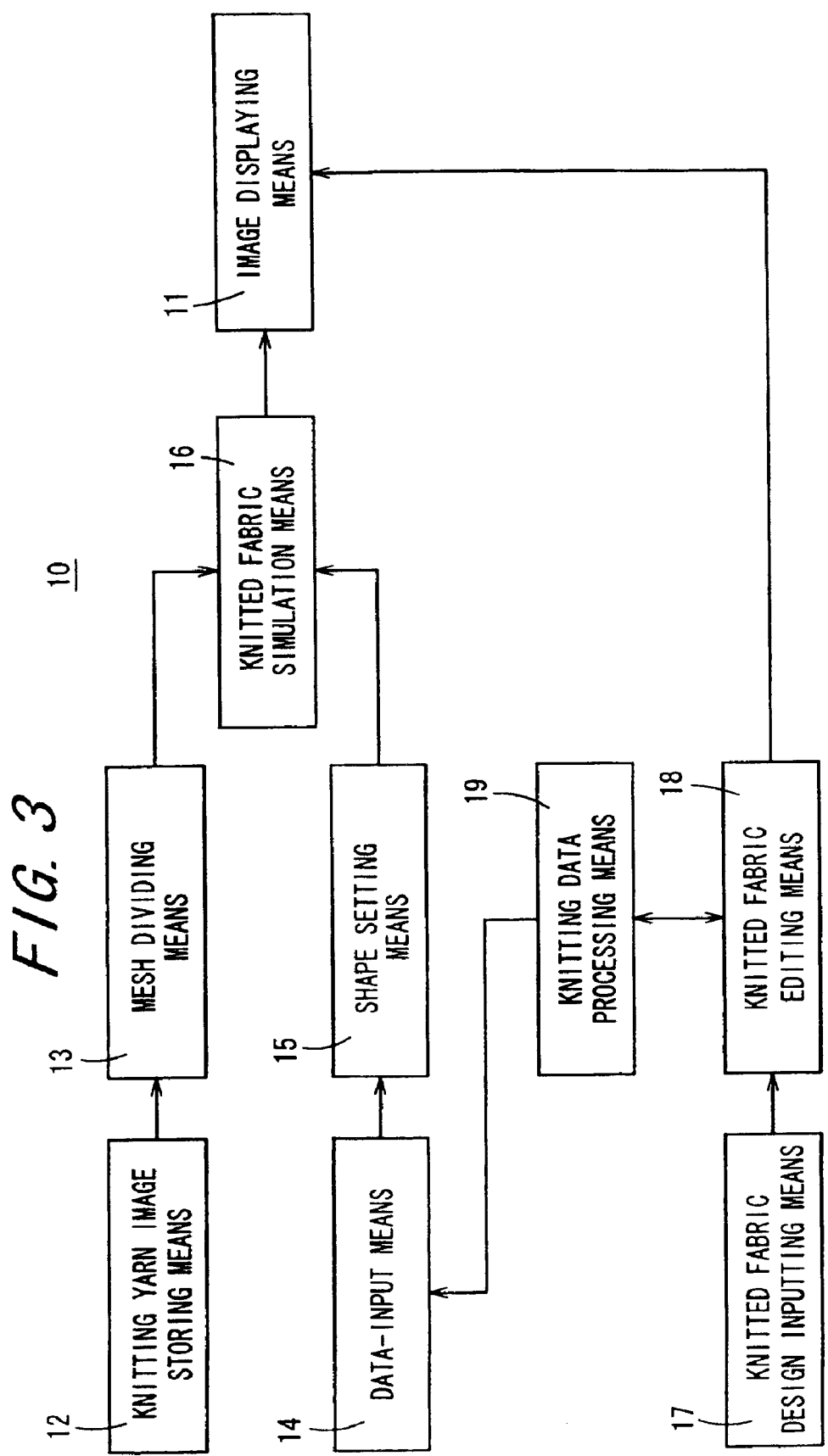
FIG. 3 is a block diagram showing a schematic functional configuration of a knit design apparatus 10 that implements the knit design method of FIG. 1.

FIG. 3 shows a schematic functional configuration of a knit design apparatus 10 that implements the knit design method of FIG. 1. The knit design apparatus 10 performs knitted fabric design using color codes as disclosed, for example, in JP-A 60-71748 described above, and displays the results on image displaying means 11. The knit design apparatus 10 includes knitting yarn image storing means 12, mesh dividing means 13, data-input means 14, shape setting means 15, knitted fabric simulation means 16, knitted fabric design inputting means 17, knitted fabric editing means 18 and knitting data processing means 19.

In the knitting yarn image storing means 12, the image data 1 of a plurality of kinds of knitting yarns is previously stored. The image data 1 of the knitting yarn of FIG. 1(a) is image data that is represented transparent by removing the background portion, for example, by the chromakey process.

The mesh dividing means 13 divides the image data 1 of the knitting yarn into a plurality of meshes 2, as shown in FIG. 1(a). When dividing into the meshes 2, if the portion around the knitting yarn is included, image data 1 of the knitting yarn can include information on fluffiness or the like.

For the image data 1 of the knitting yarn stored in the knitting yarn image storing means 12, a length of at least one cycle is necessary, where the cycle as a unit is a predetermined length in which at least one of the shape, the color or the state of fluffiness of the knitting yarn changes with regularity. A longer length such as two cycles or three cycles can be used. When a plurality of elements change with different cycles, the overall periodic pattern can be reflected by selecting a cycle that is the lowest common multiple of each cycle.

Knitting data of knitted fabrics to be simulated is inputted to the data-input means 14. The knitting data of the knitted fabric is the same as the conventional knitting data, and a knitting method is designated for each knitting stitch constituting the knitted fabric. Knitting stitch symbols can be inputted directly. The shape setting means 15 sets the shape of the knitting stitch loop 4 for each knitting stitch, and also sets the shape of the transformed mesh 3, based on the knitting data of the knitted fabric inputted to the data-input means. The method for setting the shape of the knitting stitch loop 4 will be described later.

The knitted fabric simulation means 16 performs simulation of the knitted fabric 6 by transforming the image data 1 of the knitting yarn to the shape of the transformed mesh 3 set by the shape setting means 15 for each mesh 2 divided by the mesh dividing means 13. The results of the simulation are displayed as images in the image displaying means 11.

The knitted fabric design inputting means 17 is provided for input operation for arranging images of knitting stitch loops that are previously prepared to design a knitted fabric. The knitted fabric editing means 18 arranges a texture pattern or the like on a basic knitted fabric, performs an editing process of changing its shape or changing the position while dividing a basic knitted fabric and a pattern portion into different layers, synthesizes images of knitting stitches rendered in a layer structure as the images of the knitted fabric, and displays the images in the image displaying means 11. However, the knitted fabric that is synthesized by combining individual knitting stitch images is artificial, so that natural continuity cannot be obtained in detail portions. Furthermore, since a large number of images of knitting stitches should be prepared, a large storage capacity is required to handle a plurality of types of knitting yarns. However, a knitted fabric closer to the final knitted fabric 6 can be obtained as a result of design than that with the conventional symbols or color codes for stitch knitting, so that a knitted fabric can be designed in an intuitionally recognizable manner. The knitting data processing means 19 generates data for making a knitted fabric corresponding to the image of the knitted fabric that is generated by the knitted fabric editing means 18 and inputs the data to the data-input means 14. Thus, it is possible to perform simulation based on the design results of the knitted fabric.

The image data of a knitting stitch used for the design of a knitted fabric can be also generated by the same approach as simulating the knitted fabric 6. When a knitting yarn is thus selected, a set of knitting stitch loop shapes for design is prepared with the selected knitting yarn, and the overall work up to the simulation of the knitted fabric 6 with the design results can be finished with natural image representation.

Figure 4:
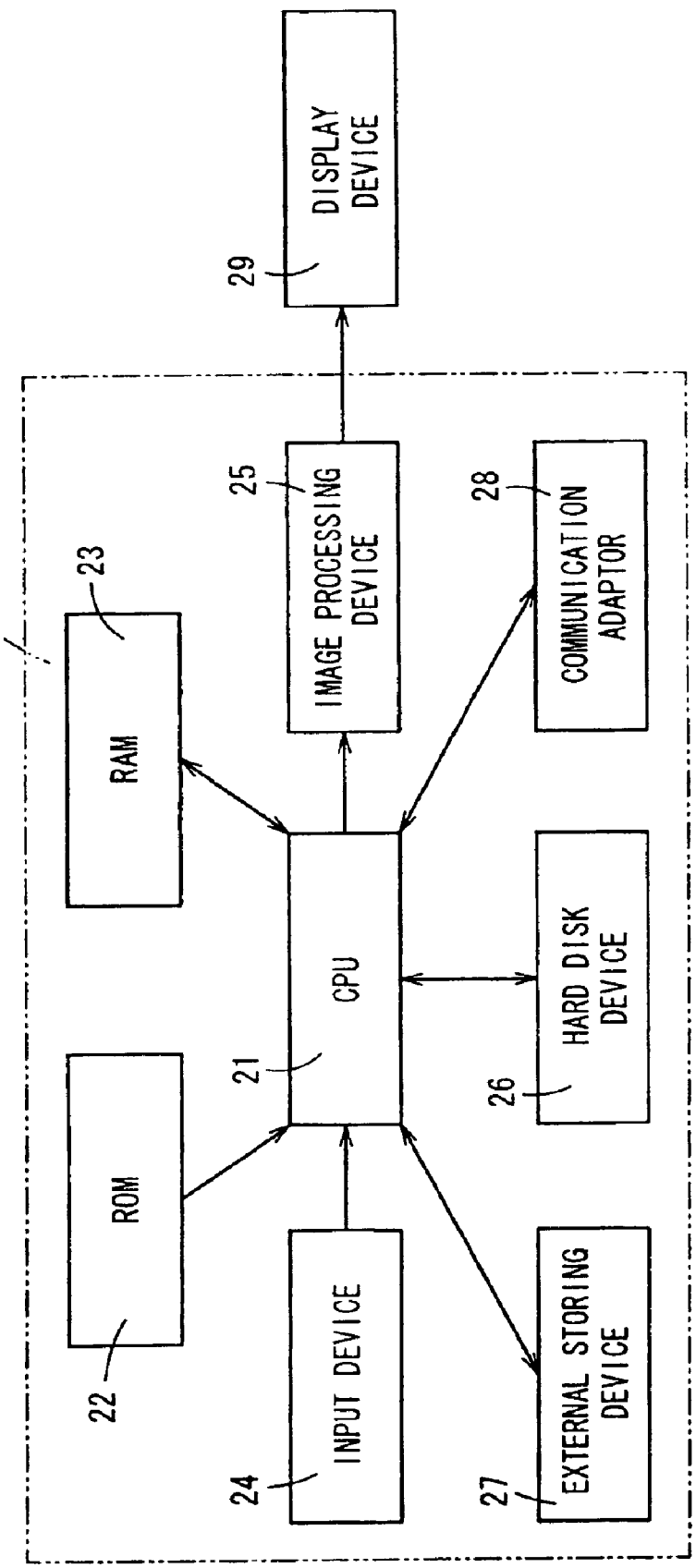
FIG. 4 is a block diagram showing a schematic electrical configuration of a computer apparatus 20 that can serve as the knit design apparatus 10 of FIG. 3.

FIG. 4 shows a schematic electrical configuration of a computer apparatus 20 that can function as the knit design apparatus 10 of FIG. 3. In the computer apparatus 20, a CPU 21 functions as the knit design apparatus 10 of FIG. 3 according to programs previously stored in a ROM 22 or programs deployed in a RAM 23. An input device 24 receives instructions or operations from the designer, serving as apart of the data-input means 14 or the knitted fabric design inputting means 17 of FIG. 3. A keyboard or a pointing device such as a mouse, a trackball, and a pen tablet can be used as the input device 24. The images of a knitting stitch or a knitted fabric are processed in an image-processing device 25. A hard disk device 26 stores programs deployed in the RAM 23 or stores image data of a knitting yarn, serving as the knitting yarn image storing means 12 of FIG. 3. An external storing device 27, to/from which a recording medium is attached/removed, is used to deliver data for making a knitted fabric or deliver programs or image data. Data or programs can be downloaded from an information communication network such as the internet via a communication adaptor 28. The images outputted from the image-processing device 25 are displayed in a display device 29 corresponding to the image displaying means 11 of FIG. 3.

Figure 5:
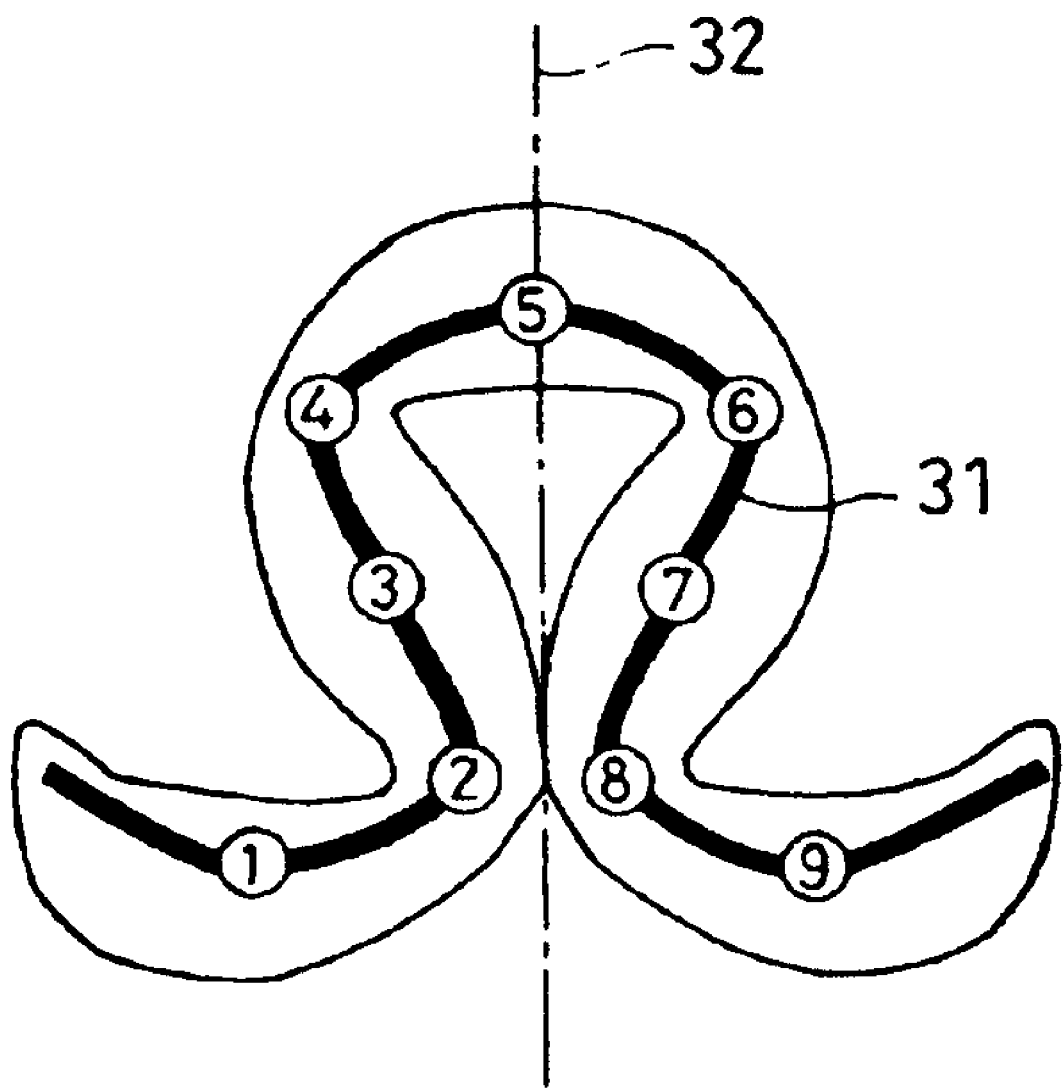
FIG. 5 is a diagram showing a basic shape 30 of a knitting stitch loop that is handled in this embodiment.

FIG. 5 shows a basic shape 30 of a knitting stitch loop to which this embodiment is directed. The basic shape 30 is a knitting stitch shape formed with a basic knitting operation that is made by displacing a knitting needle to the knitting position in a flat knitting machine, and constitutes a front stitch or a back stitch of so-called Jersey stitches. The basic shape 30 is made of a needle loop, which is a peak portion of a loop formed by being pulled by a needle, and a sinker loop, which is a trough portion of a loop formed by being held by a sinker. In the basic shape 30, one unit is constituted by arranging the peak portion of a loop at the center of the unit, and halves of the trough portion on both ends of the peak portion of a loop. When the loop is joined to the neighboring knitting stitch loops such that the ends of the trough portions are joined, knitting stitch loops that are continuous in the course direction can be expressed. When the knitting stitch loops that are continuous in the course direction are joined while being displaced in the wale direction, which is the direction orthogonal to the course direction, and the upper and lower relationship of the portion in which the knitting stitch loops are overlapped are processed according to a predetermined rule, then the knitted fabric made by a flat knitting machine can be simulated and displayed.

The central line 31 of the knitting yarn forming one unit of a knitting stitch loop of the basic shape 30 has line symmetry with respect to the symmetry line 32 that traverses the center of both the ends. Nine control points ① to ⑨ are set along the central line 31, and thus the shape of the knitting stitch loop can be represented by the positional coordinates of the control points ① to ⑨. The manner in which the knitting stitch loops look when they are overlapped or the limit of the line width on which the transformation state of the mesh is set can be defined based on the control points. For the control points that are in contact with the neighboring knitting stitch loop, the line width is limited so that the knitting yarn is rendered to be narrow because the knitting yarn is hooked. The number of the control points is not limited to nine. An increase of the number of the control points may make it possible to handle knitting stitch loops with more complex shape.

The basic shape of the knitting yarn also includes the case where a knitting needle is not displaced and held at a miss-stitch position so that a loop is not formed (hereinafter, referred to as "miss"). When the preceding loop shape is miss even in the knitting stitch loops of Jersey stitches, the knitting yarn looks different. As a result, the following cases are assumed as the shape of the basic loops: the case of miss as shown in Table 1; the case of knit as shown in Table 2; and the case of tuck as shown in Table 3. Table 3 includes the case where the shape of the previous course in knitting is miss, and this is the case where a knitting yarn is hooked with a knitting needle carrying no knitting stitch loop. When there is no limitation regarding the line width, the knitting yarn is rendered with the actual width. The limit values are set on both sides or one side, taking one stitch as a unit. When the yarn width of the knitting yarn exceeds the limit value, the knitting yarn is rendered with the size of the limit value. When the yarn width is not more than the limit value, the knitting yarn is rendered with the actual yarn width. The actual size of one stitch depends on the rendering resolution or the gauge of the flat knitting machine, so that it is calculated at the time of rendering.

TABLE 1

Miss

| control points | X coordinate | Y coordinate | limit of line width |
| --- | --- | --- | --- |
| 1 (starting point) | 0.00 | 0.00 | 1 stitch on both sides |
| 2 to 4 | not used | | |
| 5 | 0.50, midpoint between ① and ⑨ | 0.00 | 1 stitch on both sides |
| 6 to 8 | not used | | |
| 9 (end point) | 1.00 | 0.00 | 1 stitch on both sides |

TABLE 2

Knit

| control points | X coordinate | Y coordinate | limit of line width |
| --- | --- | --- | --- |
| 1 (starting point) | 0.00 | 0.00 | ½ stitch for upper half |
| 2 | 0.36 | 0.30 | ¼ stitch on both sides |
| 3 | 0.25, midpoint between ① and ⑤ | 0.85, midpoint between ① and ⑤ | 1 stitch on both sides |
| 4 | 0.14, position symmetrical to ② based on ③ | 1.40, position symmetrical to ② based on ③ | ¼ stitch on both sides |
| 5 | 0.50, midpoint between ① and ⑨ | 1.70 | ½ stitch for lower half |
| 6 | 0.86, position symmetrical to ④ based on ⑤ | 1.40, the same as ④ | ¼ stitch on both sides |
| 7 | 0.75, position symmetrical to ③ based on ⑤ | 0.85, the same as ③ | 1 stitch on both sides |
| 8 | 0.64, position symmetrical to ② based on ⑤ | 0.30, the same as ② | ¼ stitch on both sides |
| 9 (endpoint) | 1.00 | 0.00, the same as ① | ½ stitch for upper half |

TABLE 3

Tuck

| control points | X coordinate | Y coordinate | limit of line width |
|---|---|---|---|
| 1 (starting point) | 0.00 | 0.00 | ½ stitch for upper half |
| 2 | 0.05 | 0.30 | ¾ stitch for upper half |
| 3 | 0.10 | 0.85, midpoint between ① and ⑤ | ¾ stitch for upper half |
| 4 | 0.14, position symmetrical to ② based on ③ | 1.40, position symmetrical to ② based on ③ | ¼ stitch on both sides |
| 5 | 0.50, midpoint between ① and ⑨ | 1.70 | ½ stitch for lower half |
| 6 | 0.86, position symmetrical to ④ based on ⑤ | 1.40, the same as ④ | ¼ stitch on both sides |
| 7 | 0.90 | 0.85, the same as ③ | ¾ stitch for upper half |
| 8 | 0.95 | 0.30, the same as ② | ¾ stitch for upper half |
| 9 (endpoint) | 1.00 | 0.00, the same as ① | ½ stitch for upper half |

The basic shape 30 shown in FIG. 5 corresponds to the knit shown in Table 2. The control ①, which is the starting point, and the control point ⑨, which is the end point, are opposite ends in the trough portion, and the control ⑤ is the midpoint of the starting point and the end point, that is, the center of the entire shape and also the center of the peak portion. A plurality of control points ②, ③, and ④, and ⑥, ⑦ and ⑧ are set between the center and the opposite ends of the basic shape 30. The control point ③ is set at the midpoint of the control points ① and ⑤. The control point ② is set at the midpoint of the control points ① and ③ and is set at an arbitrary position on the central line 31. The control point ④ is set at a potion symmetrical to the control point ② based on the control point ③. The control points ⑧, ⑦, and ⑥ that are positioned symmetrically to the control points ②, ③, and ④ with respect to the symmetry line 32 are set in the same manner. In Table 2, when knitting stitch loops are arranged in the wale direction, the position of each control point is set such that the control points ② and ⑧ are aligned in the course direction with the control points ④ and ⑥ in the preceding course. However, the positions of the control points ② and ⑧ are arbitrary, and even when knitting stitch loop are aligned, it is not necessary that the control points ②, ⑧, ④, and ⑥ are aligned in a straight line.

In this embodiment, the knitting stitch loops in the case of miss, knit and tuck are used as the basic shape. The control points in the case of miss and tuck are set based on the basic shape 30 of knit. Although the limit of the line width in each control point is described with reference to Tables 1 to 3, when a knitting stitch having a special shape such as hemming stitches is used, a similar table can be prepared.

When simulating a knitted fabric, first, the control points of each knitting stitch loop are calculated based on the knitting data of a knitted fabric to be simulated. For knitting stitch loops different from the basic shapes, such as miss, knit or tuck, the position of each control point is displaced relatively. The central line connecting these control points is subjected to spline approximation so as to calculate rendered points on the central line that has been subjected to spline approximation. The number of rendered points per unit of a knitting stitch loop is not fixed, but depends on, for example, the loop length. The length between the neighboring rendered points is a length of one section of the transformed meshes 3, and the shape of the transformed meshes 3 is determined. Square meshes 2 into which the image data 1 of a knitting yarn is divided are also prepared corresponding to the length between the rendered points. The length of one section of the meshes 2 is the same as the length between the neighboring rendered points. The knitting yarn of the knitting yarn image data 1 corresponding to the meshes 2 is transformed corresponding to the transformed meshes 3. The image data 1 of the knitting yarn is used as a yarn having an indefinite length as described above, and the meshes 2 are set sequentially on the knitting yarn image data 1 corresponding to each knitting stitch loop and transformed in accordance with the meshes 3, so that images of knitting stitch loops are generated.

Figure 6:
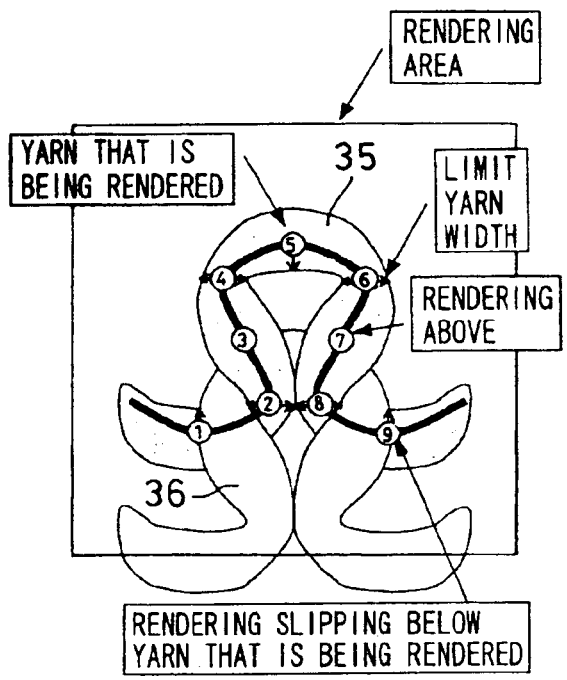
FIG. 6 is a diagram showing an example rendered with front stitches of the basic shape 30 of FIG. 5.
Figure 6:
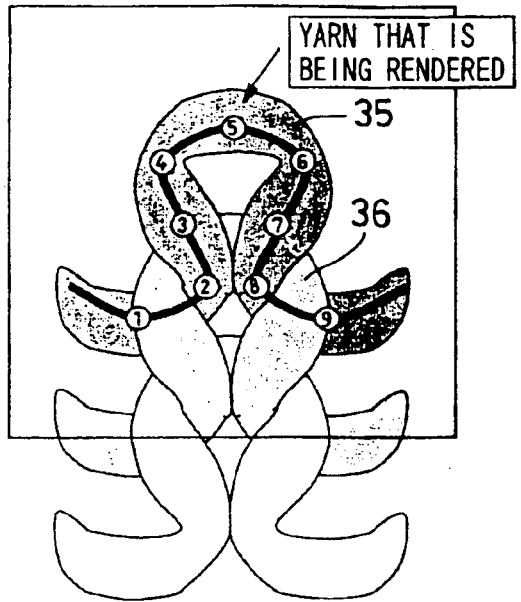
Figure 7:
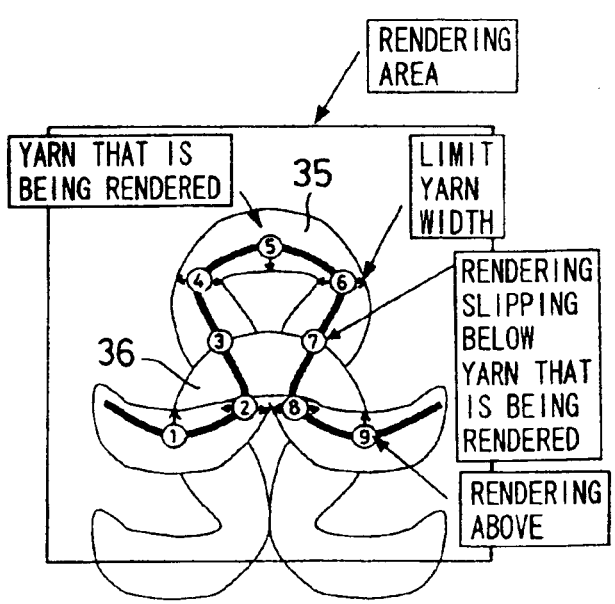
FIG. 7 is a diagram showing an example rendered with back stitches of the basic shape 30 of FIG. 5.
Figure 7:
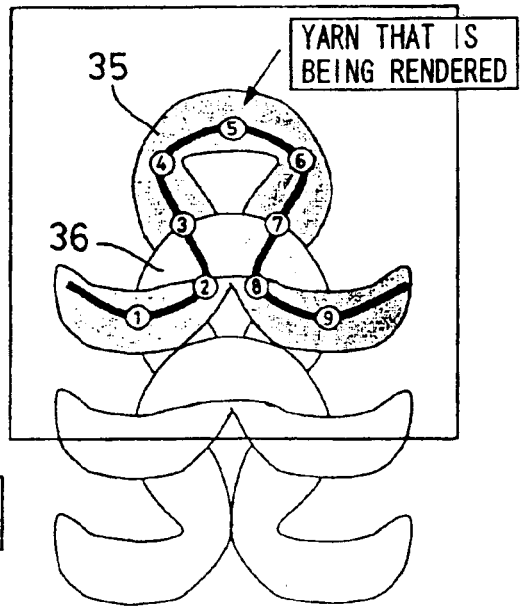

FIGS. 6 and 7 show the concept for rendering, taking the upper and lower relationship into consideration, when rendering a knitting stitch loop image 4 constituting the knitted fabric 6 of FIG. 1(c) as a predetermined loop 35, taking an already rendered loop as a lower loop 36. FIG. 6 shows the front stitches, and FIG. 7 shows the back stitches. The knitting stitch loop image rendered as the predetermined loop 35 in FIGS. 6(a) and 7(a) becomes the lower loop 36 when the next knitting stitch loop image is rendered as the predetermined loop 35, as shown in FIGS. 6(b) and 7(b). Hereinafter, the knitting stitch loops are rendered sequentially for every course, so that images of the knitted fabric can be generated.

Table 4 below shows the determination basis of the upper and lower relationship of the basic shape 30 of a knitting stitch loop with respect to the control points when a loop is rendered as the predetermined loop 35. Further, Table 5 shows the determination basis with respect to the lower loop 36. It is determined whether each control point ① to ⑨ of the predetermined loop 35 is positioned above or below the lower loop 36 by determining whether the predetermined loop 35 to be rendered or the lower loop 36 that is below the predetermined loop is a front stitch or a back stitch.

TABLE 4

Predetermined loop

| control point | front stitch | back stitch |
|---|---|---|
| 1 | rendering slipping below | overwriting rendering |
| 3 | overwriting rendering | rendering slipping below |
| 7 | overwriting rendering | rendering slipping below |
| 9 | rendering slipping below | overwriting rendering |

TABLE 5

Lower loop

| control point | front stitch | back stitch |
|---|---|---|
| 5 | rendering slipping below | overwriting rendering |

When determining the shape of a knitting stitch loop, the coordinates of the control points or the yarn width are calculated in accordance with displacement or tension caused by the influence of crossing or gathering at the surrounding knitting stitches, so that the state in which a knitting yarn is pulled to the course direction and the wale direction by crossing or gathering of the knitting yarns can be displayed closer to the actual knitted fabric.

Figure 8:
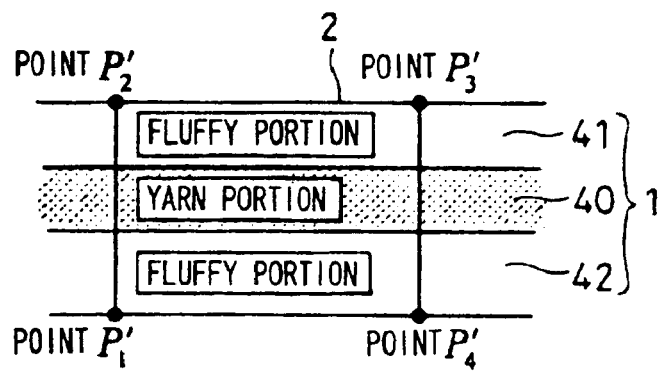
FIG. 8 is a diagram showing a mesh transformation approach of image data of a knitting yarn in this embodiment.
Figure 8:
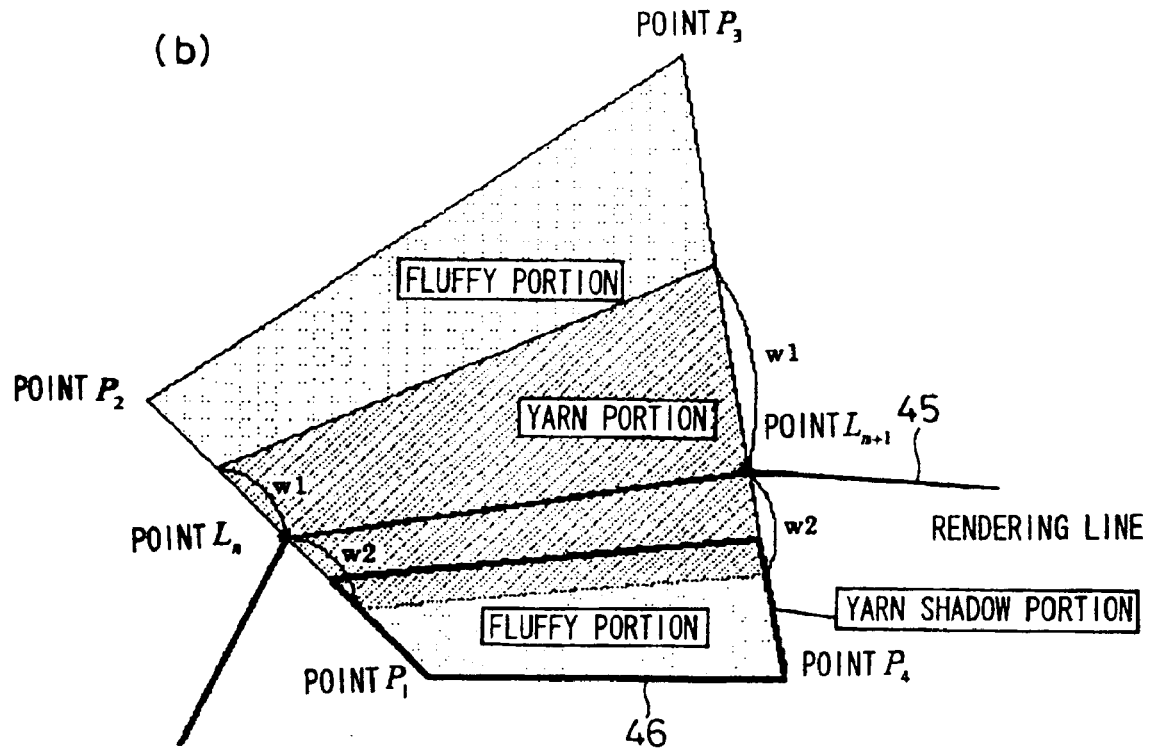

FIG. 8 shows the concept for rendering by transforming the image data 1 of a knitting yarn in accordance with the transformed meshes 3 using the mesh transformation approach. FIG. 8(a) shows one section of the meshes 2 into which the image data 1 of a knitting yarn is divided. The image data 1 of a knitting yarn includes a yarn portion 40 and fluffy portions 41 and 42. Square meshes 2 are set with respect to the image data 1 of a knitting yarn having a linearly extending shape. The vertices of the mesh 2 are taken as $P_1'$, $P_2'$, $P_3'$, and $P_4'$.

FIG. 8(b) shows the concept for preparing mesh data in accordance with the transformed meshes 3. The vertices $P_1$, $P_2$, $P_3$, and $P_4$ of the transformed meshes 3 correspond to the vertices $P_1'$, $P_2'$, $P_3'$, and $P_4'$ of mesh 2 shown in FIG. 8(a), respectively. Each portion in the transformed mesh 3 is rendered along a rendering line 45 shown in FIG. 8(b) while moving the rendering line 45 from, for example, the line segment connecting the vertex $P_2$ and the vertex $P_3$ to the line segment connecting the vertex $P_1$ and the vertex $P_4$. The data of pixels for rendering is prepared according to the image data of pixels along a straight line corresponding to the rendering line 45 while moving the straight line from the line segment connecting the vertex $P_2'$ and the vertex $P_3'$ of the mesh 2 of FIG. 8(a) to the line segment connecting the vertex $P_1'$ and the vertex $P_4'$.

In FIG. 8(b), a shadow portion 46 of a yarn is added to the image data of the knitting yarn. The rendering line 45 is a line segment connecting a point $L_n$ and a point $L_{n+1}$ in the transformed mesh 3. The inclination of the line segment is obtained based on the positions of the point $L_n$ and the point $L_{n+1}$, the position on which a shadow is located is determined based on that value, and the shadow portion 46 of the yarn is set. For high speed processing, the shadow portion 46 of the yarn can be limited to, for example, an arbitrary range on the lower side. For the concentration of the shadow, the level value can be calculated based on the inclination of the points $L_n$ and $L_{n+1}$, and reflected at the time of mesh rendering. Rendering is performed either on an already rendered yarn or slipping below, depending on the height information of the points $L_n$ and $L_{n+1}$.

When the transformed mesh 3 shown in FIG. 8(b) is divided only based on the control points set in the basic shape 30 shown in FIG. 5, individual meshes become large so that a smooth loop shape cannot be obtained. Therefore, the basic shape 30 of a knitting stitch loop is subjected to spline approximation and more rendering points than the control points are set along the central line 31 of the knitting yarn with a narrower interval than that of the control points. Then, the knitting stitch loop is mesh-divided by rendering points, so that the loop shape becomes smooth.

Figure 9:
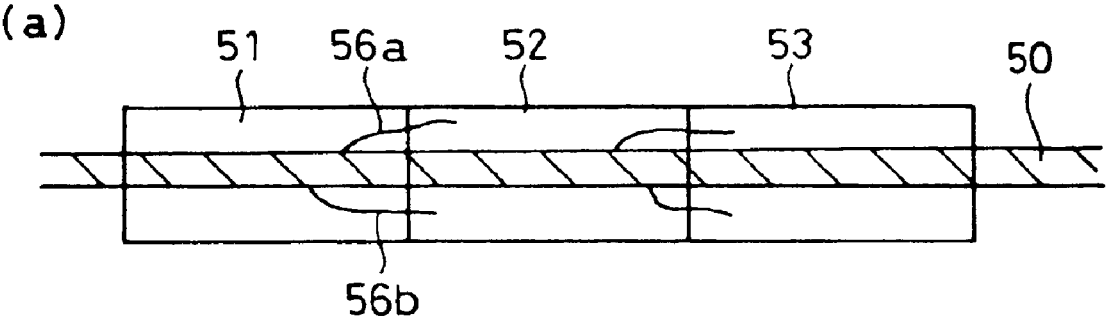
FIG. 9 is a diagram showing conventional transformation approach of image data of a knitting yarn.
Figure 9:
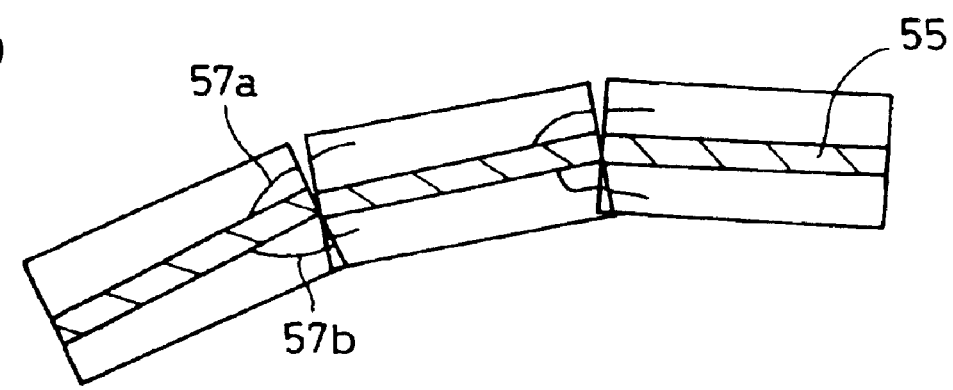

FIG. 9 shows the concept using segment division disclosed in JP-A 7-70890 and the reason why it is difficult to render a knitting stitch loop with fluffiness or the like reflected. According to this concept, image data 50 of a knitting yarn is divided into segments 51, 52, and 53 as shown in FIG. 9(a), and synthesized as a part of a knitting stitch loop 55 as shown in FIG. 9(b). When fluffy portions 56a and 56b are present in an overlapped portion between the segments 51, 52 and 53 of FIG. 9(a), reproduction thereof is such that they are cut, broken or curved at the border of the segments, as seen in fluffy portions 57a and 57b, as shown in FIG. 9(b).

Figure 10:
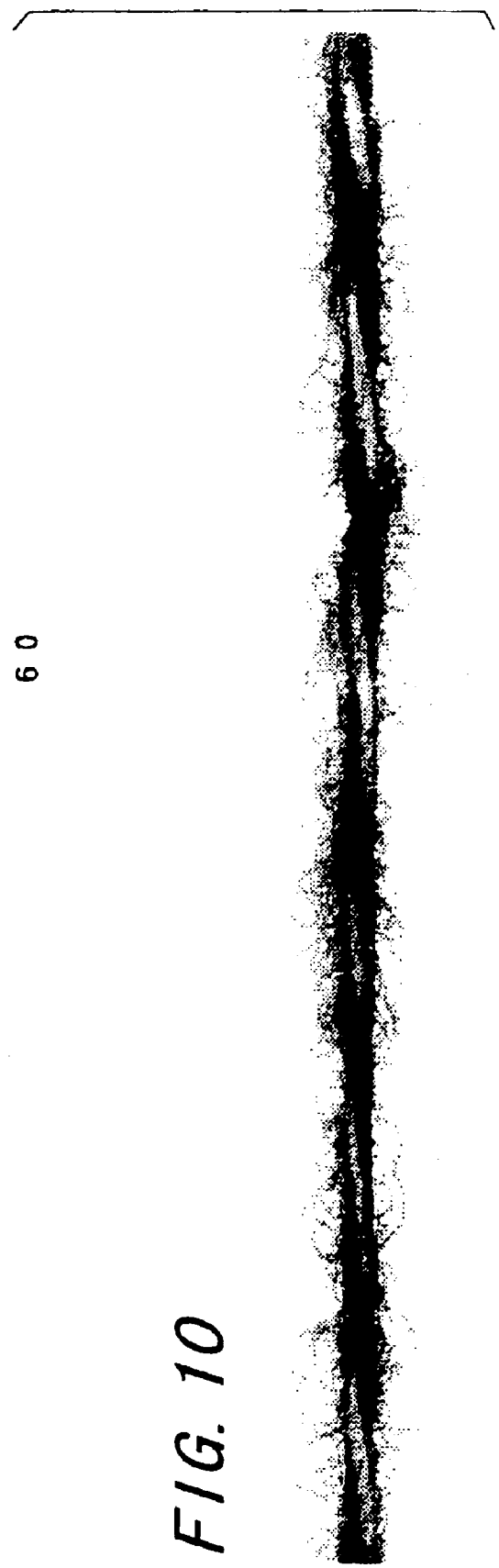
FIG. 10 is a diagram showing an example of image data 60 of a fluffy knitting yarn.
Figure 11:
FIG. 11 is a diagram showing the image data 60 of the knitting yarn of FIG. 10 and examples of knitted fabrics that are simulated with the same.
Figure 11:
Figure 11:
Figure 11:
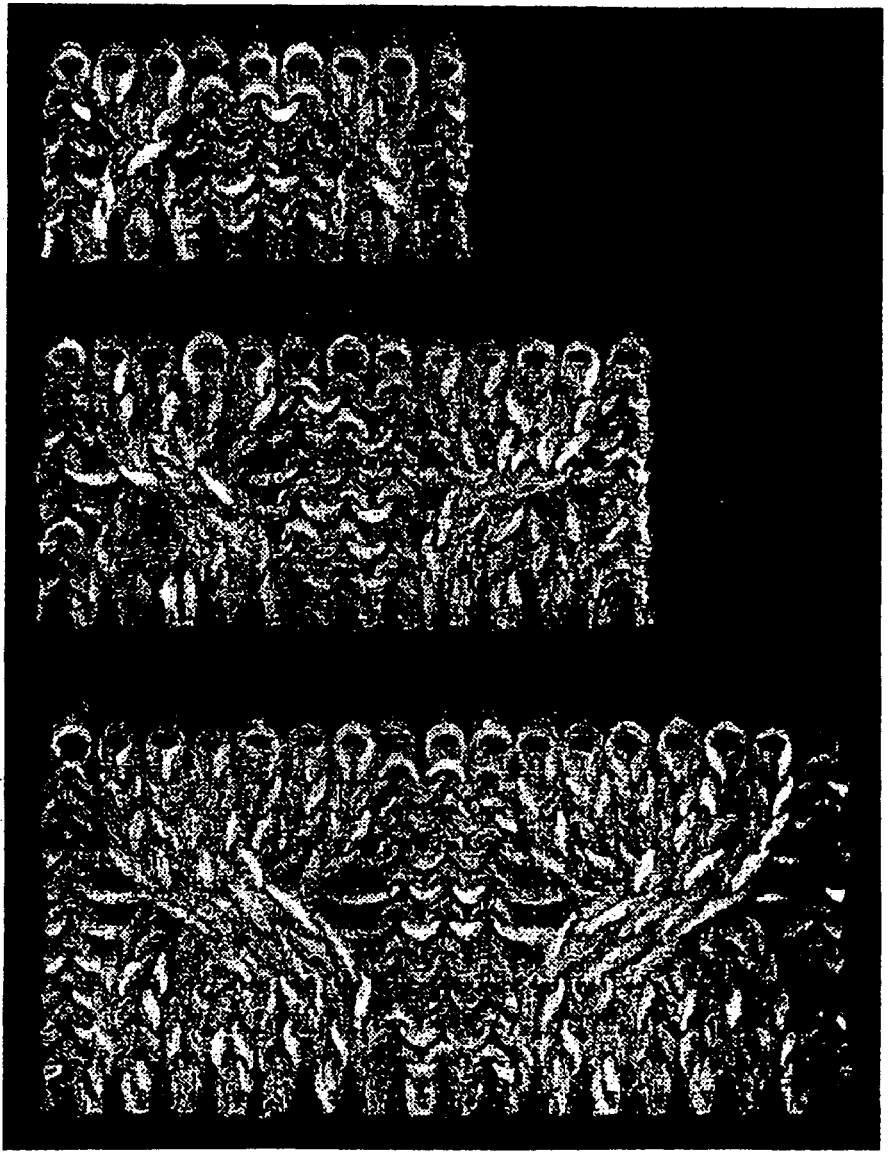

When the invention is applied, even the image data 60 of a very fluffy knitting yarn as shown in FIG. 10 can be represented sufficiently. FIG. 11 shows an example of a texture pattern knitted fabric obtained with the image data 60 of the knitting yarn shown in FIG. 10. A texture pattern in which gathering is combined and crossing is formed is shown.

Figure 12:
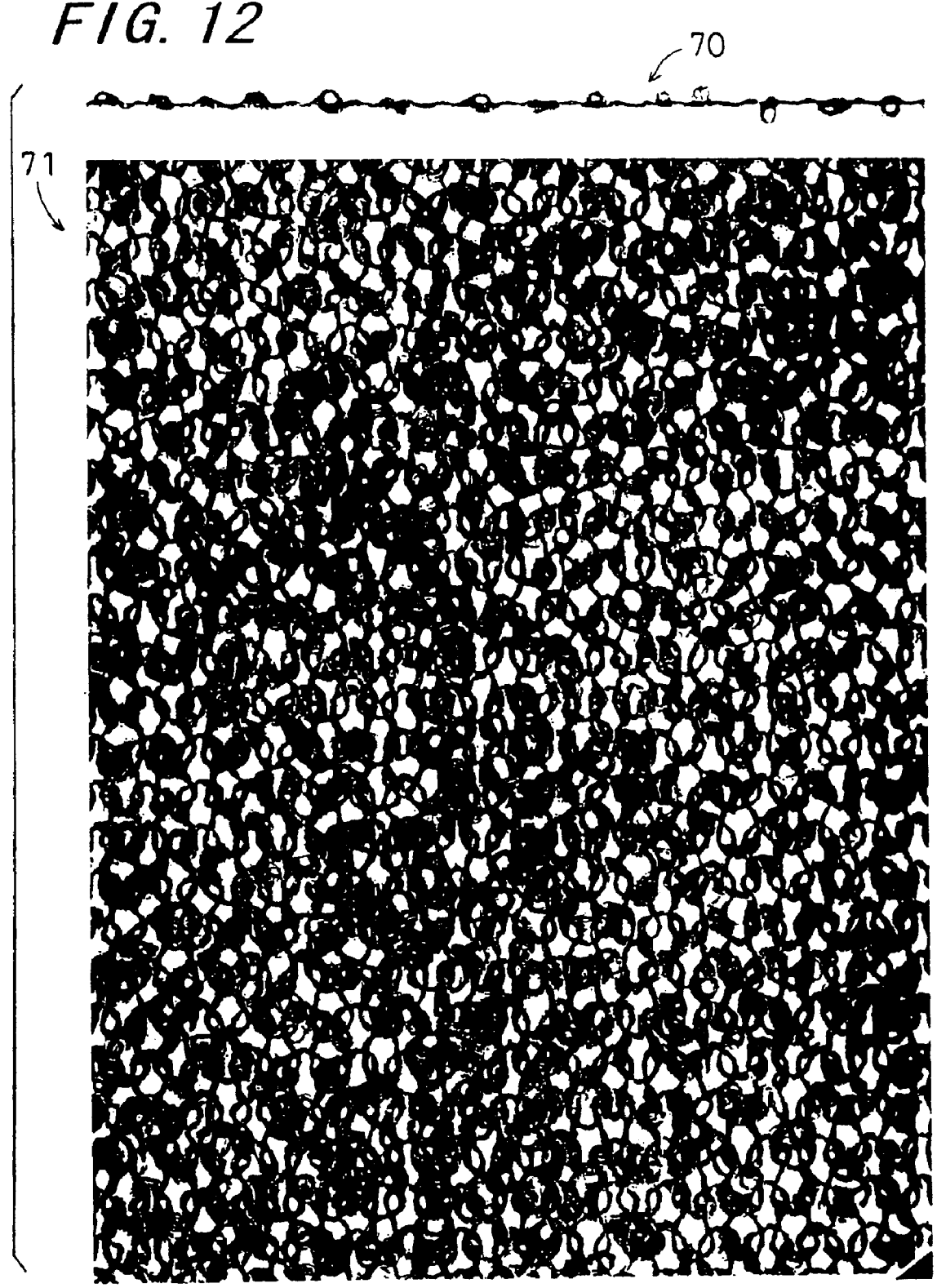
FIG. 12 is a diagram showing image data 70 of knitting yarn of a loop yarn and an example of a knitted fabric 71 using the same.
Figure 13:
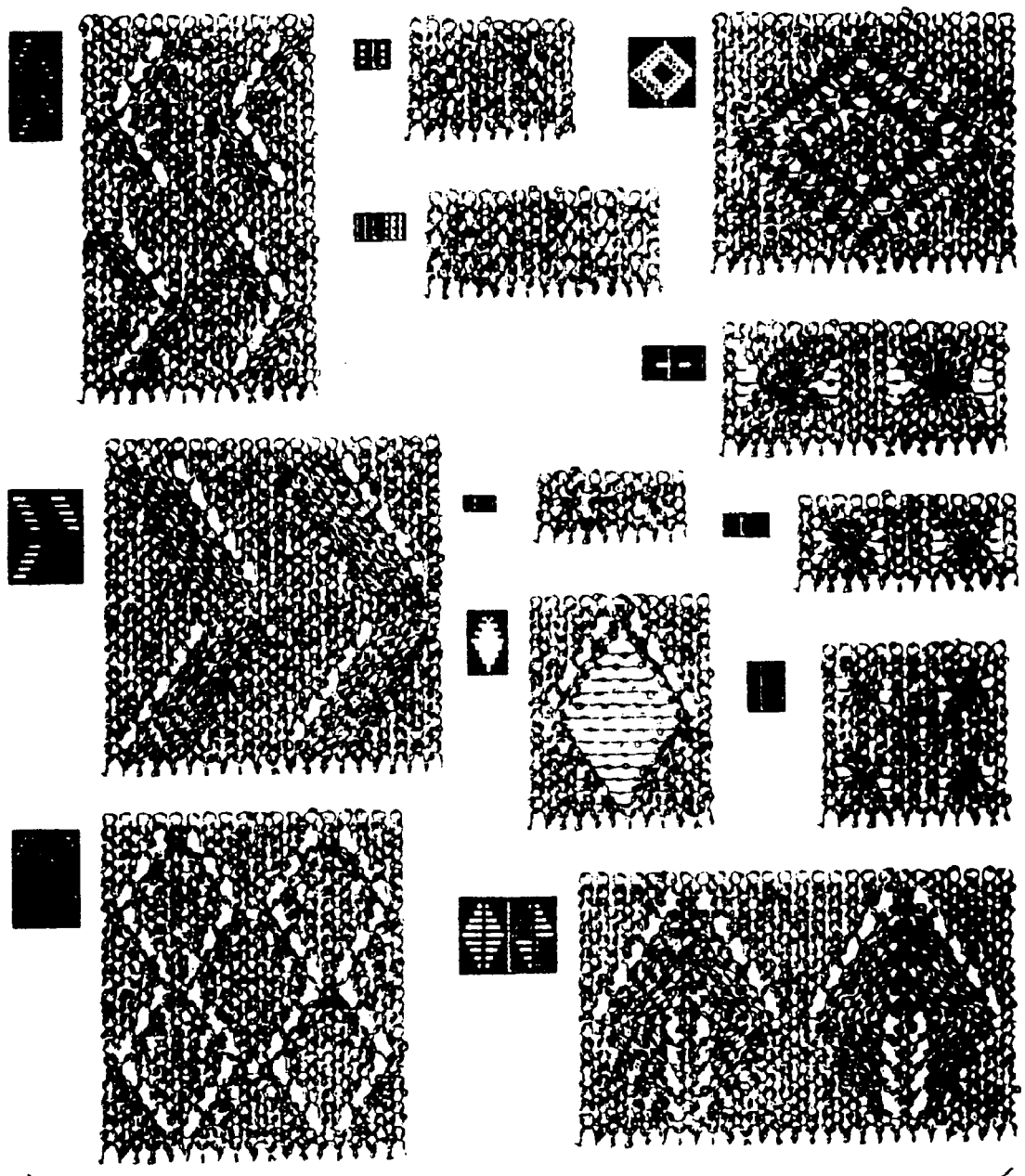
FIG. 13 is a diagram showing an example of a knitted fabric using a loop yarn of FIG. 12.

FIG. 12 shows knitting yarn image data 70 of a fancy yarn called, for example, a loop yarn and a knitted fabric 71 that is simulated and displayed. In this loop yarn, a part of a fiber constituting the yarn projects outward in the form of a loop. Also in the case of a fancy yarn such as a loop yarn, the portion of the loop or the like that projects outward is treated as a fluffy portion, so that the knitted fabric can be simulated such that its feeling and the like can be reproduced faithfully. In addition to the loop yarn, there is one called a nep yarn as a fancy yarn. In the image data 70 of a knitting yarn, the shapes of the loops projecting outward are irregular, and do not necessarily have definite periodic patterns. In such a case, it is preferable to store image data of a section as long as possible. Furthermore, FIG. 13 shows examples of knitted fabrics with texture patterns obtained with the image data 70 of a knitting yarn.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As described above, according to the invention, the transformation state of the mesh is set based on the data for making a knitted fabric. The image data of a knitting yarn in which a linearly extending state is divided into a plurality of meshes having a predetermined shape is transformed in accordance with the transformation state that goes along the knitting stitch loop for each mesh. The overlapped portion generated by joining of knitting stitch loops is displayed on the upper side or the lower side according to a predetermined rule, so that the feel of the knitting yarn can be reflected on the knitting stitch loop constituting the knitted fabric, and images in which the feeling of the simulated knitted fabric is closer to that of a knitted fabric made of an actual knitting yarn can be displayed.

Furthermore, according to the invention, the shape of the knitting stitch loop is displayed with the coordinates of a plurality of control points. In the case of the predetermined basic shape, these coordinates are set on the predetermined reference line of the knitting yarn. A shape of a knitting stitch loop different from the basic shape can be handled by displacing the position of each control potion relatively, and the transformation state of the mesh is set based on information such as whether or not there is a limitation regarding the line width that can be designed for each control point, or the size of the limit value. Therefore, the transformation states of meshes that can be used for various knitting stitch loop shapes can be set.

Furthermore, according to the invention, for the knitting stitch loop of the basic shape formed by a knitting operation of a flat knitting machine, one unit is constituted by one peak portion and two halves of a trough portion, the peak portion being sandwiched by the two halves of the trough portion. Control points are set at a plurality of points, that is, at the opposite ends of one unit, the center, and between the center and the opposite ends, and it is possible to designate whether rendering is performed on the upper side of the earlier knitted knitting stitch loop or on the lower side thereof for each control point. Therefore, the shape of a knitting stitch loop and the upper and lower relationship at the time of overlapping can be displayed using the control points.

Furthermore, according to the invention, the image data of a knitting yarn is divided into meshes such that fluffy portions are also included, so that even in the transformation of the mesh shape corresponding to a knitting stitch loop, fluffiness can be reproduced and the feeling of the knitted fabric made of a fluffy knitting yarn can be simulated reliably.

Furthermore, according to the invention, a knitted fabric using a knitting yarn in which at least one of the shape, the color and the fluffy state changes over a section having a predetermined length can be displayed with images in which the knitted fabric is simulated with the feeling of such a knitting yarn used exhibited.

Furthermore, according to the invention, a knitted fabric is designed by aligning the shapes of various knitting stitch loops previously prepared, so that the design can be changed rapidly in the middle of the process, and the knitted fabric finally can be simulated with images with the feeling close to that of the actual knitted fabric.

Furthermore, according to the invention, the shape of a knitting stitch loop in use for designing a knitted fabric is generated by simulation in which image data of a linear knitting yarn is transformed in accordance with the transformation state that goes along the knitting stitch loop. Therefore, the image data of a knitting yarn can be utilized from the stage of designing the knitted fabric, and the knitted fabric can be simulated with natural representation without sense of incongruity as a whole.

Furthermore, according to the invention, a knitted fabric can be simulated with images with the feeling close to that of the actual knitted fabric by executing a program on a computer.

Furthermore, according to the invention, in order to design a knitted fabric while displaying images of a knitted fabric on the image displaying means, the image data of a linearly extending knitting yarn is stored in the knitting yarn image storing means, and the image data of the knitting yarn is divided into a plurality of meshes having a predetermined shape by the mesh dividing means. When data for making a knitted fabric to be simulated with images is inputted to the data-input means, the shape setting means sets a transformation state of the meshes such that the meshes are transformed along each knitting stitch loop shape constituting the knitted fabric. Then, the knitted fabric simulation means simulates a knitted fabric with images by transforming the image data of the knitting yarn so as to be along each knitting stitch loop for each mesh and displaying the portion in which the knitting stitch loops are overlapped on the upper side or the lower side according to a predetermined rule. Therefore, the knitted fabric can be displayed with the feeling as if the knitted fabric is actually made of that knitting yarn.

Furthermore, according to the invention, when a knitted fabric is designed with images by aligning image data representing the shape of various knitting stitch loops that are previously prepared, the images of the knitted fabric can be displayed by simulation with the feeling obtained when actually knitting with the knitting yarn.

Furthermore, according to the invention, a knitted fabric can be stimulated with images, using a knitting yarn selected from a plurality of kinds, so that the difference in the feeling between knitted fabrics due to the difference of the knitting yarn can be easily compared.

What is claimed is:

1. A knit design method for simulating and displaying an image of a knitted fabric made of a knitting yarn, based on data for making a knitted fabric, comprising:

dividing image data of a linearly extending knitting yarn into a plurality of meshes having a predetermined shape;

setting a transformation state of the meshes so as to go along each knitting stitch loop shape constituting the knitted fabric and maintain a connecting state between the meshes;

transforming the image data of the knitting yarn in accordance with transformation of the mesh for each mesh; and simulating the knitted fabric with images by allowing the image data of the knitting yarn that is transformed along the knitting stitch loop to be continuous according to a predetermined rule, performing rendering with displacement of the continuous image data of the knitting yarn so as to be joined in a direction intersecting with a direction where the knitting yarn is continuous while partially overlapping the continuous image data of the knitting yarn, and performing rendering a portion in which the knitting stitch loops are overlapped on the upper side or the lower side so as to correspond to the joined state.

2. The method of claim 1, wherein the shape of the knitting stitch loop is represented by coordinates of a plurality of control points set on a predetermined reference line of the knitting yarn forming the knitting stitch loop with respect to a predetermined basic shape, a shape of a knitting stitch loop different from the basic shape is handled by relatively displacing the position of each control point, and the transformation state of the meshes is set based on information on a line width that can be designated for each control point.

3. The method of claim 2, wherein the basic shape has a peak portion of a knitting stitch loop shape formed by a knitting operation with a flat knitting machine and halves of a trough portion on both sides of the peak portion, a plurality of control points are set at both ends of the trough portion of the basic shape, at the center of the peak portion and between both the ends and the center, and it is possible to designate whether rendering is performed on the upper portion of the previously knitted knitting stitch loop or on the lower side thereof.

4. The method of claim 1, wherein the image data of the knitting yarn is divided into the meshes in such a manner that a fluffy portion outside the knitting yarn is included.

5. The method of claim 1, wherein the knitting yarn is a knitting yarn in which at least one of the shape, the color and the fluffiness state changes over a section having a predetermined length, and the image data is divided into the meshes at least over the section.

6. The method of claim 1, wherein the data for making a knitted fabric is generated based on design of a knitted fabric that is performed by aligning various shapes of a knitting stitch loop that are previously prepared.

7. The method of claim 6, wherein the shape of the knitting stitch loop is generated by simulation in which image data of the linearly extending knitting yarn is previously transformed in accordance with the transformation state that goes along the knitting stitch loop.

8. A program for executing the knit design method of claim 1 on a computer.

9. A knit design apparatus for designing a knitted fabric while displaying an image of a knitted fabric on image displaying means, comprising:

knitting yarn image storing means for storing image data of a linearly extending knitting yarn;

mesh dividing means for dividing the image data of the knitting yarn that is read out from the knitting yarn image storing means into a plurality of meshes having a predetermined shape;

data-input means for inputting data for making a knitted fabric to be simulated with images;

shape setting means for setting a transformation state of the meshes based on data for making a knitted fabric that is inputted to the data-input means so as to go along each knitting stitch loop shape constituting the knitted fabric and maintain a connecting state between the meshes; and knitted fabric simulation means for transforming the image data of the knitting yarn that is divided into the meshes by the mesh dividing means for each mesh in accordance with the transformation state of the meshes set by the shape setting means so as to go along each knitting stitch loop, and displaying a portion in which the knitting stitch loops are overlapped according to a predetermined rule on the upper side or the lower side to simulate the knitted fabric with images.

10. The knit design apparatus of claim 9, further comprising: knitted fabric designing means capable of designing a knitted fabric with images by aligning image data representing various shapes of a knitting stitch loop that are previously prepared, for generating the data for making a knitted fabric based on the image data of the designed knitted fabric and inputting the data to the data-input means.

11. The knit design apparatus of claim 9, wherein the knitting yarn image storing means can store image data of a plurality of kinds of knitting yarns, and the apparatus further comprising:

knitting yarn designating means for designating a knitting yarn so as to select the image data of the knitting yarn that is to be divided into the meshes by the mesh dividing means among the plurality of kinds.

12. The method of claim 2, wherein the image data of the knitting yarn is divided into the meshes in such a manner that a fluffy portion outside the knitting yarn is included.

13. The method of claim 3, wherein the image data of the knitting yarn is divided into the meshes in such a manner that a fluffy portion outside the knitting yarn is included.

14. The method of claim 2, wherein the knitting yarn is a knitting yarn in which at least one of the shape, the color and the fluffiness state changes over a section having a predetermined length, and the image data is divided into the meshes at least over the section.

15. The method of claim 3, wherein the knitting yarn is a knitting yarn in which at least one of the shape, the color and the fluffiness state changes over a section having a predetermined length, and the image data is divided into the meshes at least over the section.

16. The method of claim 4, wherein the knitting yarn is a knitting yarn in which at least one of the shape, the color and the fluffiness state changes over a section having a predetermined length, and the image data is divided into the meshes at least over the section.

17. The method of claim 12, wherein the knitting yarn is a knitting yarn in which at least one of the shape, the color and the fluffiness state changes over a section having a predetermined length, and the image data is divided into the meshes at least over the section.

18. The method of claim 13, wherein the knitting yarn is a knitting yarn in which at least one of the shape, the color and the fluffiness state changes over a section having a predetermined length, and the image data is divided into the meshes at least over the section.

19. The knit design apparatus of claim 10, wherein the knitting yarn image storing means can store image data of a plurality of kinds of knitting yarns, and the apparatus further comprising:

knitting yarn designating means for designating a knitting yarn so as to select the image data of the knitting yarn that is to be divided into the meshes by the mesh dividing means among the plurality of kinds.

* * * * *

UNITED STATES PATENT AND TRADEMARK OFFICE
CERTIFICATE OF CORRECTION

PATENT NO.         : 6,880,367 B2                                        Page 1 of 1
APPLICATION NO. : 10/491538
DATED              : April 19, 2005
INVENTOR(S)        : Noriyuki Suzuki It is certified that error appears in the above-identified patent and that said Letters Patent is hereby corrected as shown below:

On the Title Page in Item (54), please change "KNIT DESIGN METHOD AND DEVICE" to --KNIT DESIGN METHOD AND APPARATUS--.

Signed and Sealed this

Fifth Day of February, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,880,367 B2 | Page 1 of 1 |
| APPLICATION NO. | : 10/491538 | |
| DATED | : April 19, 2005 | |
| INVENTOR(S) | : Noriyuki Suzuki | |

It is certified that error appears in the above-identified patent and that said Letters Patent is hereby corrected as shown below:

On the Title Page in Item (54) and Column 1, line 1, please change "KNIT DESIGN METHOD AND DEVICE" to --KNIT DESIGN METHOD AND APPARATUS--.

This certificate supersedes the Certificate of Correction issued February 5, 2008.

Signed and Sealed this

Twenty-sixth Day of February, 2008

JON W. DUDAS
*Director of the United States Patent and Trademark Office*